US006745993B2

(12) United States Patent
Mueller

(10) Patent No.: US 6,745,993 B2
(45) Date of Patent: Jun. 8, 2004

(54) FUEL INJECTION VALVE

(75) Inventor: Martin Mueller, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 10/129,222

(22) PCT Filed: Aug. 25, 2001

(86) PCT No.: PCT/DE01/03266

§ 371 (c)(1),
(2), (4) Date: Jul. 24, 2002

(87) PCT Pub. No.: WO02/18776

PCT Pub. Date: Mar. 7, 2002

(65) Prior Publication Data

US 2003/0146400 A1 Aug. 7, 2003

(30) Foreign Application Priority Data

Sep. 1, 2000 (DE) .......................................... 100 43 085

(51) Int. Cl.[7] ........................ F02M 691/10; F16K 31/02
(52) U.S. Cl. .................. 251/50; 251/129.19; 239/585.1
(58) Field of Search ............................. 251/48, 50, 52, 251/53, 64, 129.16, 129.19, 129.21; 239/533.11, 585.1, 585.4, 585.5

(56) References Cited

U.S. PATENT DOCUMENTS

| | | | | |
|---|---|---|---|---|
| 2,114,961 A | * | 4/1938 | Gille | 251/129.19 X |
| 2,392,741 A | * | 1/1946 | Hurlburt | 251/129.19 X |
| 4,708,289 A | * | 11/1987 | Szablewski et al. | 239/585.1 X |
| 4,766,405 A | | 8/1988 | Daly et al. | |
| 4,878,650 A | * | 11/1989 | Daly et al. | 251/50 X |
| 5,118,076 A | * | 6/1992 | Homes | 251/50 X |
| 5,203,538 A | | 4/1993 | Matsunaga et al. | |
| 5,288,025 A | * | 2/1994 | Cerny | 251/50 X |
| 5,299,776 A | | 4/1994 | Brin, Jr. et al. | |
| 5,944,053 A | * | 8/1999 | Kabierschke et al. | 251/48 X |
| 6,279,873 B1 | * | 8/2001 | Eichendorf et al. | 251/129.19 |
| 6,318,646 B1 | * | 11/2001 | Mattioli et al. | 239/585.1 |
| 6,450,424 B1 | * | 9/2002 | Horbelt | 239/585.1 |
| 6,575,388 B2 | * | 6/2003 | Aota et al. | 251/50 X |

FOREIGN PATENT DOCUMENTS

| | | |
|---|---|---|
| DE | 198 16 315 | 10/1999 |
| DE | 198 55 547 | 6/2000 |

* cited by examiner

*Primary Examiner*—Michael Mar
*Assistant Examiner*—Eric Keasel
(74) *Attorney, Agent, or Firm*—Kenyon & Kenyon

(57) ABSTRACT

A fuel injector, such as a fuel injector for fuel injection systems in internal combustion engines, includes a valve needle, the valve-closure member of which cooperates with a valve seat surface to form a sealing seat, and includes an armature engaging with the valve needle, the armature being arranged on the valve needle in an axially movable manner and being damped by a damping element including an elastomer. A ring space is formed between damping element and the valve needle, which is filled with fuel, the ring space being in contact with a throttle gap.

13 Claims, 4 Drawing Sheets

FUEL INJECTION VALVE

FIELD OF THE INVENTION

The present invention is based on a fuel injector of the type set forth in the main claim.

BACKGROUND INFORMATION

A fuel injector is referred to in U.S. Pat. No. 4,766,405, having a valve-closure member, connected to a valve needle, which acts together with a valve seat surface formed on a valve seat element to form a sealing seat. A magnetic coil is provided for electromagnetically actuating the fuel injector, the magnetic coil acting together with an armature which is connected to the valve needle by force-locking. Around the armature and the valve needle an additional cylindrical mass is provided, which is connected to the armature via an elastomeric layer.

It is believed that a disadvantage with this fuel injector may include a costly construction method with an additional component. In addition, the large surface elastomer ring is unfavorable for the pattern of the magnetic field and may hinder the closing of the field lines, and thus the achievement of great attractive forces during the opening movement of the fuel injector.

A specific embodiment of a fuel injector is also referred to in the above document in which, for damping and debouncing, a further cylindrical mass is provided around the armature and the valve needle, which is hemmed in and held in its position by two elastomeric rings. When the valve needle strikes the valve seat, this second mass may move relatively to the armature and the valve needle and prevent bouncing of the valve needle.

It is believed that a disadvantage of this specific embodiment may include an additional cost and requirement for space. Also, the armature is not decoupled, whereby its impulse on the valve needle may increase the tendency to bouncing.

A fuel injector having a valve needle and an armature is referred to in U.S. Pat. No. 5,299,776, in which the armature is movably guided on the valve needle, and the movement of which in the lift direction of the valve needle is limited by a first stop and, opposite to the lift direction, by a second stop. The play in the movement of the armature in the axial direction, fixed by the two stops, leads within certain limits to a decoupling of the inert mass of the valve needle as well as the inert mass of the armature. Within certain limits, this counteracts the bouncing back of the valve needle from the valve seat surface when the fuel injector is closed. However, since the axial position of the armature with respect to the valve needle is totally undefined, due to the free movement of the armature, bounces may be avoided to only a limited extent. In particular, with regard to the method of construction of the fuel injector referred to in the above document, what is not avoided is that the armature strikes the stop facing the valve-closure member during a closing movement of the fuel injector and transfers its linear momentum to the valve needle. This impact-like transfer of linear momentum may cause additional bounces of the valve-closure member.

Furthermore, the armature guided on the valve needle may be fastened by an elastomeric ring in a position in which it is movably clamped. To do this, the armature may be held between two flanges welded to the valve needle, there being an elastomeric ring between the armature and the lower flange. With this arrangement, however, a borehole through the armature may be necessary for the supply of fuel to the sealing seat. The boring through the armature is made close to the valve needle, the opening of the boring facing the valve seat being partially covered by the elastomeric ring. Thereby a nonuniform compression of the elastomeric ring arises, and the bore edges finally lead to the destruction of the elastomeric ring by the pressure of the edges. Additionally, this may cause excitation of vibrations of the unsupported elastomeric ring, which may also contribute to the trouble. caused by the bore edges. This may occur, for example, at low temperatures, when the elastomer converts into a stiff condition.

SUMMARY OF THE INVENTION

By contrast, an exemplary fuel injector according to the present invention may have the advantage that the armature and the valve needle are damped by a fluid damper that is formed between the armature and the valve needle by the collaboration of an elastomeric ring and a fluid-filled chamber. This may stop armature bounces from the lower armature as well as effectively damp valve needle bounces from the sealing seat.

It is believed that the damping action of the damping space between valve needle and armature wall into which fuel is squeezed from the annular space during the closing movement is an advantage.

DETAILED DESCRIPTION

Figure 1:
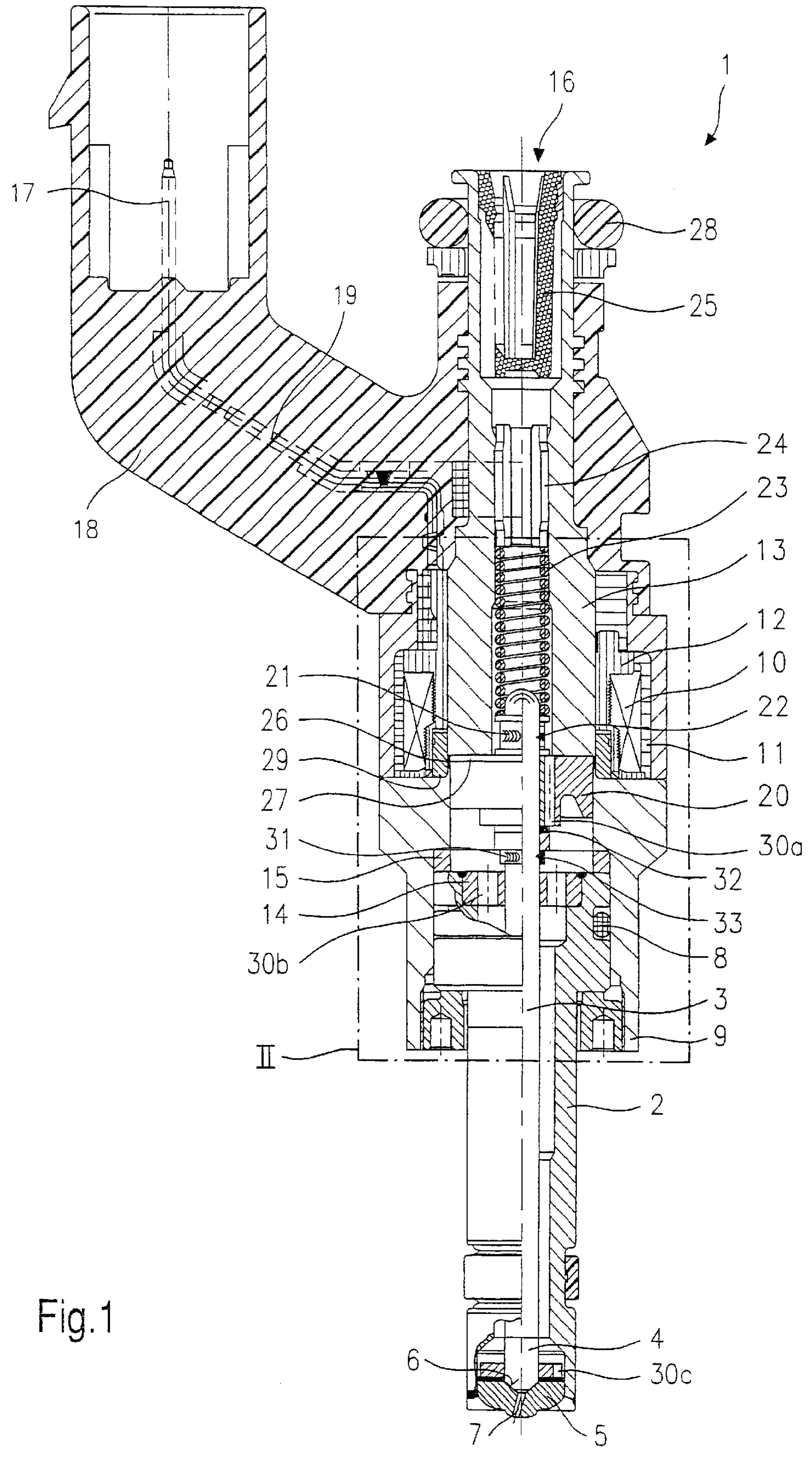
FIG. 1 illustrates a schematic section through a fuel injector having armature debouncing.
Figure 2:
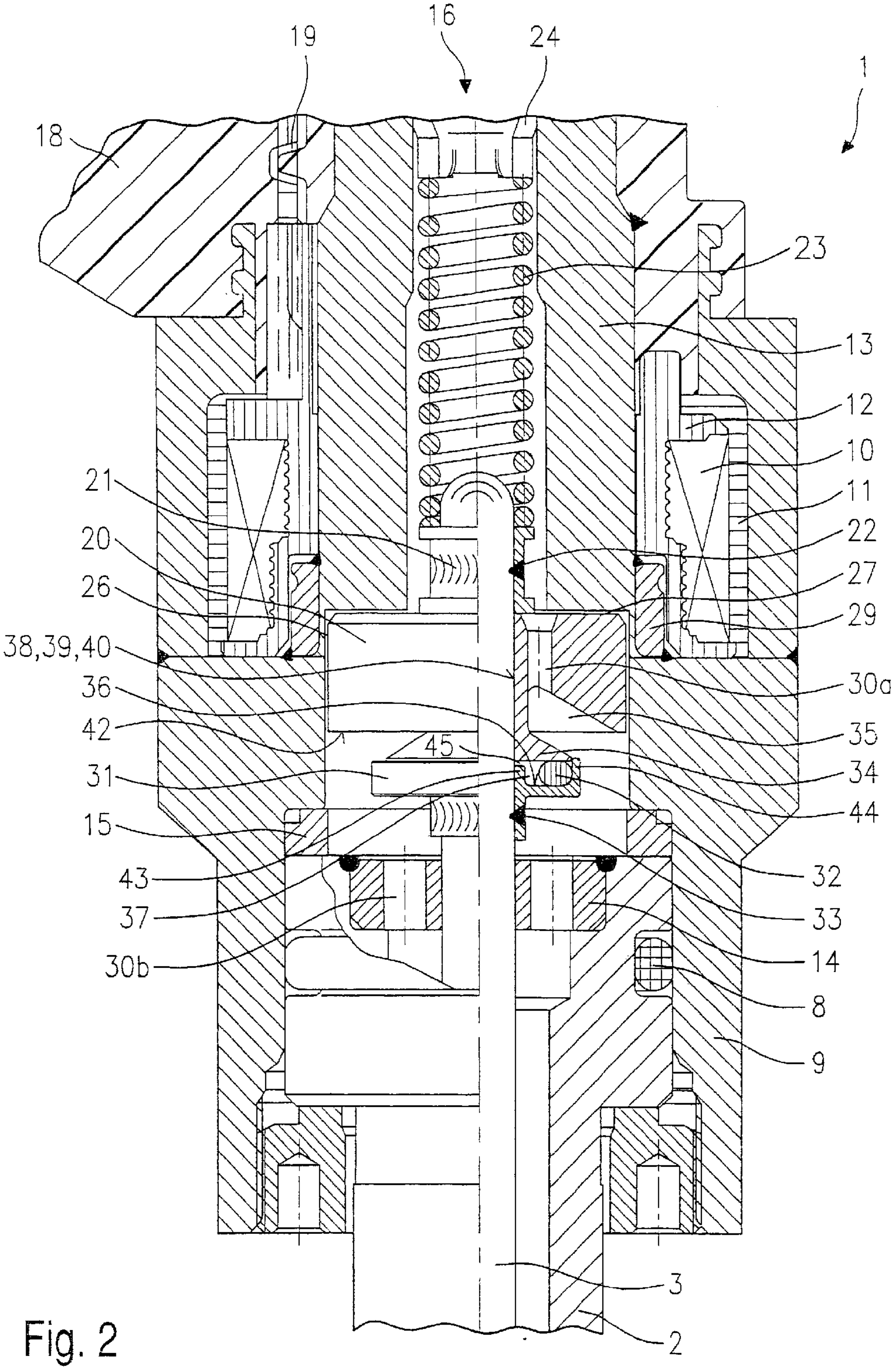
FIG. 2 is an enlarged sectional view of an exemplary fuel injector according to the present invention.
Figure 3:
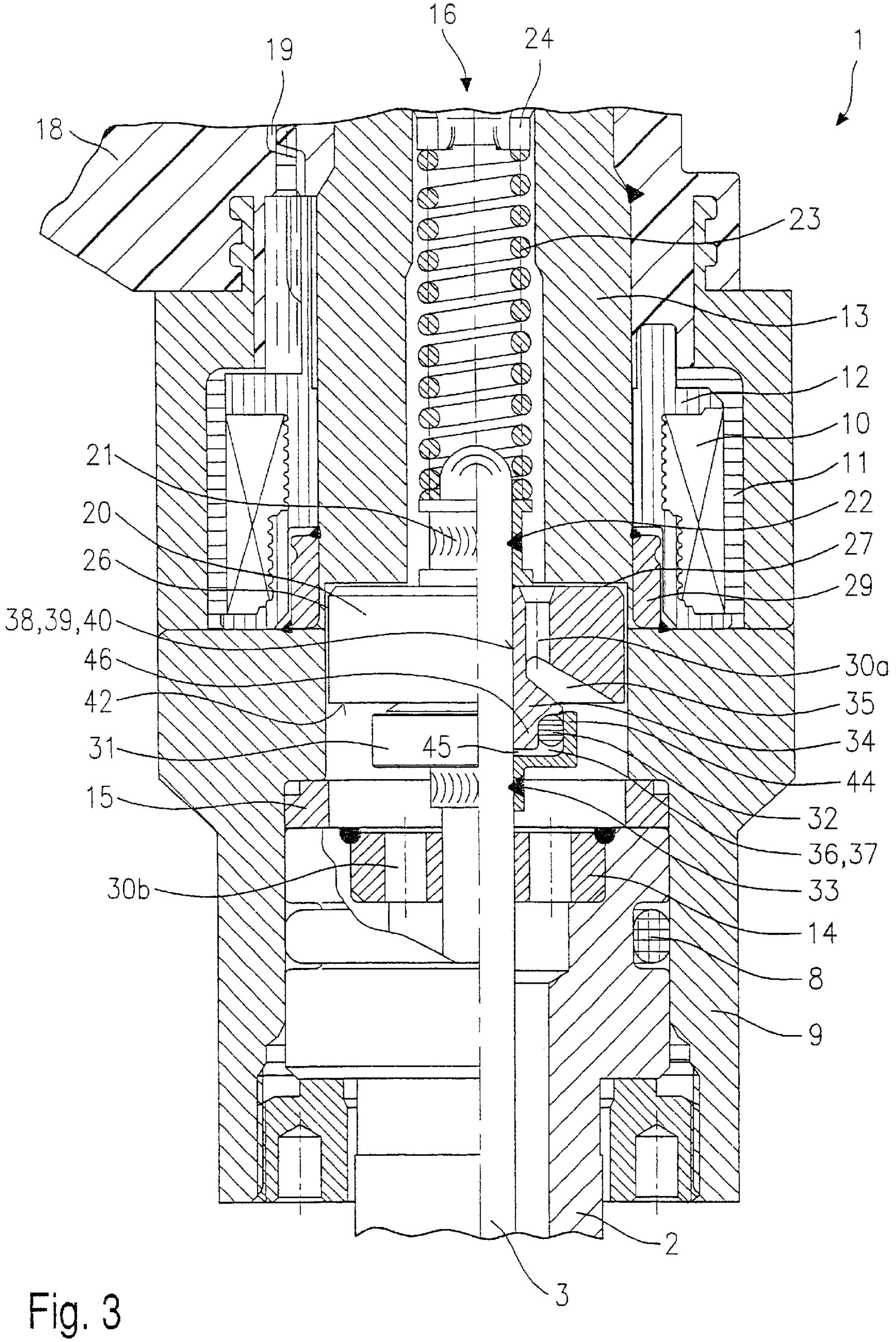
FIG. 3 is an enlarged sectional view of a second exemplary embodiment of the fuel injector according to the present invention.
Figure 4:
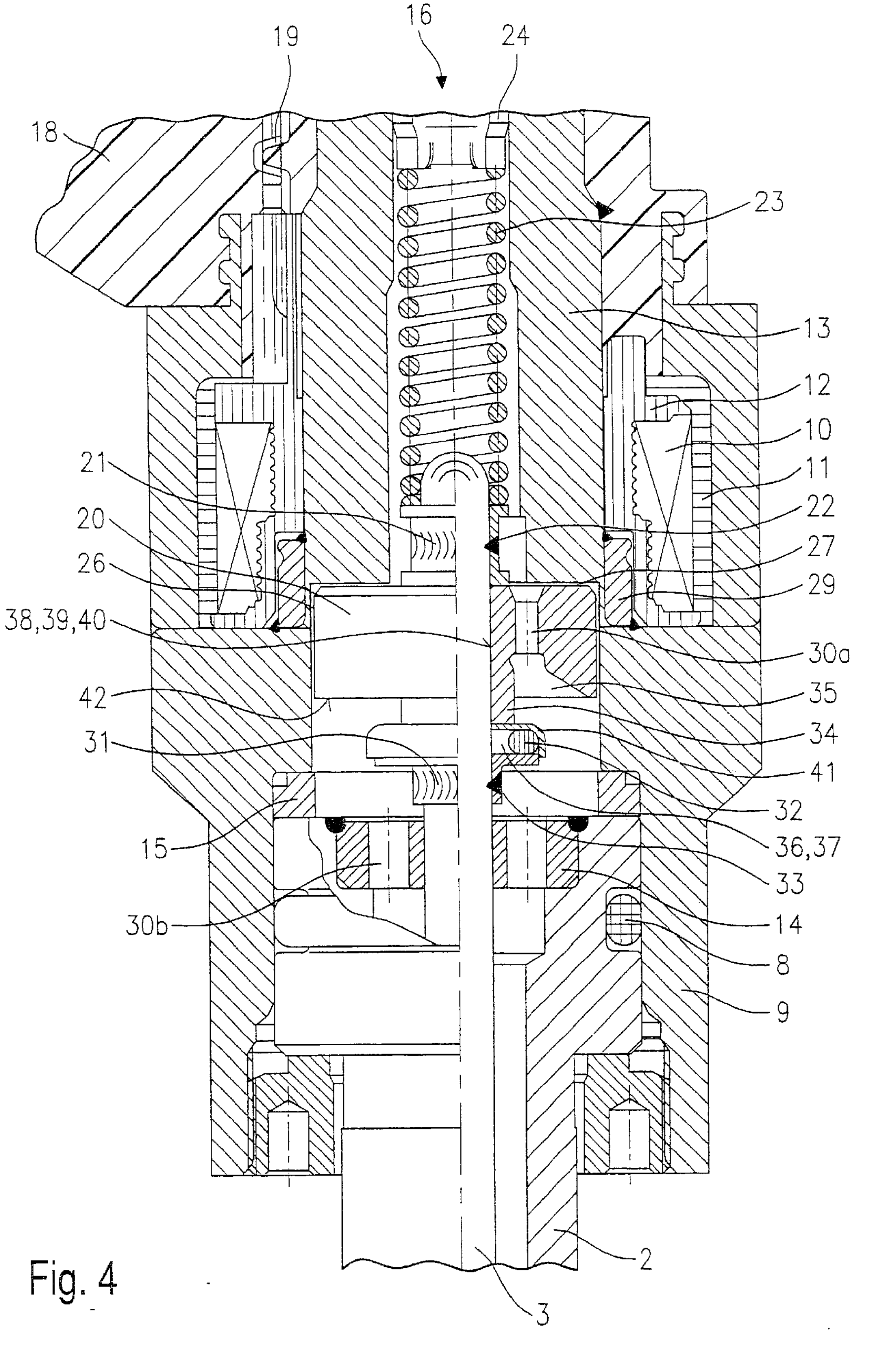
FIG. 4 is an enlarged sectional view of a third exemplary embodiment of the fuel injector according to the present invention.

Before exemplary embodiments of a fuel injector 1 according to the present invention are described more precisely with reference to FIGS. 2 through 4, to better understand the invention, a structurally similar fuel injector, apart from the measures according to the present invention, as it exists in the related art, shall be briefly explained with the aid of FIG. 1.

Fuel injector 1 is designed in the form of an injector for fuel-injection systems of mixture-compressing internal combustion engines with externally supplied ignition. Fuel injector 1 may be suitable for directly injecting fuel into a combustion chamber (not illustrated) of an internal combustion engine.

Fuel injector 1 includes a nozzle body 2, in which a valve needle 3 is positioned. Valve needle 3 is connected in operative connection to a valve-closure member 4 that cooperates with a valve-seat surface 6, arranged on a valve-seat member 5, to form a sealing seat. Fuel injector 1 in the embodiment shown in FIG. 1 is an inwardly opening fuel injector 1, having a spray-discharge opening 7. Nozzle body 2 is sealed from external pole 9 of a magnetic coil 10 by a seal 8. Magnetic coil 10 is encapsulated in a coil housing 11 and wound on a bobbin 12 which lies adjacent to an internal pole 13 of magnetic coil 10. Internal pole 13 and external pole 9 are separated from each other by a constriction 26 and are connected to each other by a non-ferromagnetic connecting part 29. Magnetic coil 10 is energized via an electric line 19 by an electric current, which may be supplied via a plug-in contact 17. Plug-in contact 17 is enclosed in a plastic jacket 18, which may be sprayed onto internal pole 13.

Valve needle 3 is guided in a valve needle guide 14, which is designed as a disk. A paired adjustment disk 15 adjusts the lift. An armature 20 is on the other side of adjustment disk 15. It is connected by force-locking to valve needle 3 via a first flange 21, and valve needle 3 is connected to first flange 21 by a welded seam 22. Braced against valve needle 21 is a return spring 23 which, in the embodiment shown in FIG. 1, is prestressed by a sleeve 24. Fuel channels 30*a* through 30*c* run through valve needle guide 14, armature 20 and valve seat member 5, which conduct the fuel, supplied via central fuel supply 16 and filtered by a filter element 25, to spray-discharge opening 7. Fuel injector 1 is sealed by a seal 28 from a fuel line (not shown).

On the spray-discharge side of armature 20 is positioned a ring-shaped damping element 32, made of an elastomeric material. Damping element 32 rests on second flange 31, which is connected by force-locking to valve needle 3 via a welded seam 33.

During manufacturing of the component including armature 20 and valve needle 3, first flange 21 is welded to valve needle 3, armature 20 and damping element 32 are slipped on, and subsequently second flange 31 is pressed on damping element 32 under pressure and also welded to valve needle 3. In this manner, armature 20 has only little, strongly damped play between first flange 21 and damping element 32.

In the neutral position of fuel injector 1, return spring 23 acts upon armature 20 counter to its lift direction so that valve-closure member 4 is retained in sealing contact against valve seat 6. Upon excitation of magnetic coil 10, a magnetic field is generated, which moves armature 20 in the lift direction, counter to the spring force of return spring 23, the lift being predefined by a working gap 27 existing in the neutral position between internal pole 13 and armature 20. Armature 20 also carries along in the lift direction flange 21, which is welded to valve needle 3. Valve-closure member 4, being connected to valve needle 3, lifts off from valve seat surface 6, and fuel guided via fuel channels 30*a* through 30*c* is sprayed off through spray-discharge opening 7.

When the coil current is switched off, after sufficient decay of the magnetic,field, armature 20 falls away from internal pole 13 due to the pressure of return spring 23, whereupon flange 21, being connected to valve needle 3, moves in a direction counter to the lift, thereby causing valve needle 3 to move in the same direction in which valve-closing body 4 sets down upon valve seat surface 6 and fuel injector 1 is closed.

In this phase the bounces occur, which are caused by armature 20 falling off from internal pole 13 in the spray-discharge direction during the closing process of fuel injector 1, and by valve needle 3, or rather valve-closure body 4 setting down upon the sealing seat.

In an extracted sectional illustration, FIG. 2 shows a section of fuel injector 1 corresponding to the section denoted by II in FIG, 1. Corresponding components are designated by corresponding reference numerals.

As compared to fuel injector 1 according to the related art, described in FIG. 1, the present first exemplary embodiment of a fuel injector 1 according to the present invention, as shown in FIG. 2, has an inner circular ring projection 34 on spray-discharge side 42 of armature 20, and a funnel-shaped recess 35. Fuel channel 30*a* opens out on funnel-shaped recess 35. Circular ring-shaped projection 34, which is penetrated by valve needle 3 in a central recess 38 of armature 20, is supported on damping element 32, and thus on second flange 31, which is integrally connected to valve needle 3 via welding seam 33. Second flange 31 has a ring-shaped depression 36 in which damping element 32 is arranged, and which is covered, as if by a lid, by circular ring-shaped projection 34. In this context, circular ring-shaped projection 34 lies on damping element 32. Ring-shaped depression 36 has an inner edge 43 facing valve needle 3, and a radially outer edge 44, which is axially higher than inner edge 43. Thus, circular ring-shaped projection 34 closes off ring-shaped depression 36 toward the outside, while in the neutral position of fuel injector 1 an axial gap remains between edge 43 and projection 34. In ring-shaped depression 36 an annular space 37 is formed, which is radially limited by valve needle 3 and damping element 32. Annular space 37 is filled with fuel that flows into annular space 37 via central recess 38 of armature 20, which acts as a throttle.

During closing of fuel injector 1, as soon as valve-closure member sets down upon valve seat surface 6, armature 20, which is positioned movably on valve needle 3, swings through. Usually, this swinging through leads to a renewed motion of armature 20 in the lift direction, which may bring on a brief, undesired further opening procedure of fuel injector 1, since thereby, valve needle 3 is also moved once more in the lift direction. This is prevented in two ways by the fuel contained in ring space 37, as well as by damping element 32.

The fuel in ring space 37 is compressed by the at first countercurrent motions of armature 20 and valve needle 3. Armature 20 may swing through only to the point at which gap 45, between edge 43 and projection 34 of armature 20, is closed. Due to the closed form of ring space 37, the fuel may leave ring space 37 only through throttle gap 39, acting like a throttle between an inner wall 40 of armature 20 and valve needle 3. Thus, the motion of armature 20 and the swing-back motion of valve needle 3 are damped. Furthermore, the swing-back motion of armature 20 may be effectively damped by damping element 32, which is positioned in ring-shaped depression 36, since damping element 32 converts a major portion of the energy of motion of armature 20 into energy of deformation of damping element 32, and because an underpressure is created in ring space 37 during the swing-back motion.

In the same view as in FIG. 2, FIG. 3 shows a second exemplary embodiment of fuel injector 1 according to the present invention.

In this exemplary embodiment, second flange 31 is furnished with a deeper ring-shaped depression 36 than in the previous exemplary embodiment shown in FIG. 2. Outer edge 44 of second flange 31 is raised, while inner edge 43 is omitted. A lower end 46 of projection 34 of armature 20 is formed so that damping element 32 is arranged radially between thin end 46 of projection 34 and edge 44 of second flange 31, an axial gap 45 being formed between lower end 46 of projection 34 and the second flange. At equal outer diameter of second flange 31 to that of the exemplary embodiment shown in FIG. 2, the effective damping volume, which is arranged below damping element 32, is thereby increased.

In the case of the second exemplary embodiment of fuel injector 1 according to the present invention, it may not be important to have accurately fitting and exact manufacturing or assembly of the individual components. This may make manufacturing and assembly of the component parts more cost-effective.

In the mode of operation, the second exemplary embodiment of fuel injector 1 according to the present invention is similar to the first exemplary embodiment shown in FIG. 2. When the fuel injector 1 is closed, armature 20 swings through, whereby damping element 32 as well as the fuel in ring space 37 are compressed by projection 34 of armature 20. Armature 20 may only swing through until lower end 46 of projection 34 strikes second flange 31. Damping element 32 absorbs the greatest part of the energy of motion of armature 20, while the fuel displaced from ring space 37 flows out via throttle gap 39 between valve needle 3 and inner wall 40 of armature 20, whereby the swinging through of valve needle 3 is braked and valve-closing member 4 is prevented from once again briefly lifting off from valve seat surface 6.

A third exemplary embodiment of fuel injector 1 according to the present invention is shown in FIG. 4. The exemplary embodiment of FIG. 3 differs little in its construction from the two previous exemplary embodiments of FIGS. 2 and 3. Instead of circular ring-shaped projection 34 of armature 20, a cap-shaped cover shell 41, on which projection 34 of armature 20 is supported, forms the ring-shaped depression 36. In the third exemplary embodiment shown in FIG. 4, ring-shaped depression 36 opens in the downstream direction of the fuel flow. Second flange 31 is flat and closes ring-shaped depression 36 like a lid in the downstream direction. Cover shell 41 may be easy to manufacture as a separate part, independently of armature 20.

Damping element 32 is positioned in ring-shaped depression 36 of cover shell 41, and ring space 37 is in contact with throttle gap 39, as in the preceding exemplary embodiments shown in FIGS. 2 and 3, between inner wall 40 of armature 20 and valve needle 3. The component parts of the third exemplary embodiment of FIG. 4 may be easy to manufacture, and armature 20 may be configured so that fuel channel 30*a*, inserted into armature 20, may be processed more easily and deburred at its downstream end.

At the closing of fuel injector 1, armature 20 swings through again in the spray-discharge direction, whereby cap-shaped cover shell 41 is pushed over second flange 31, since the outer diameter of flange 31 is equivalent to the inner diameter of the mantle region of cover shell 41 (e.g., is minimally smaller). In the exemplary embodiment shown in FIG. 4, advantageously gap 45 may not have to be limited by a special geometrical arrangement like the exemplary embodiments described above, but may be equal to the height of ring space 37. Damping element 32, lying between cover shell 41 and second flange 31, as well as the fuel present in ring space 37 are compressed by the movement, and in this context, damping element,32 absorbs the energy of motion of armature 20, while the fuel from ring space 37 is displaced into throttle gap 39 between valve needle 3 and inner wall 40 of armature 20. The swinging through of valve needle 3 is damped by the viscosity of the fuel and/or the throttle effect of throttle gap 39.

The present invention is not limited to the exemplary embodiments shown, and is also suitable, for example, for flat armatures or for any design of fuel injector.

What is claimed is:

1. A fuel injector, comprising:

a valve needle including a valve-closure member, the valve-closure member cooperating with a valve seat surface to form a sealing seat;

a damping element made of an elastomer;

a flange including a ring-shaped depression on which the damping element is arranged, the ring-shaped depression forming a ring space between the damping element and the valve needle, the ring-space being in contact with a throttle gap at the valve needle; and an armature engaging with the valve needle, the armature being arranged on the valve needle in an axially movable manner and damped by the damping element, and the damping element being arranged between the flange and the armature;

wherein the ring-space is configured to receive fuel.

2. The fuel injector according to claim 1, wherein the throttle gap is formed between the valve needle and an inner wall of the armature.

3. The fuel injector according to claim 1, wherein the armature includes a fuel channel penetrating the armature and a funnel-shaped recess on a discharge side of the armature, and wherein the fuel channel discharges into the funnel-shaped recess.

4. The fuel injector according to claim 1, wherein an inner edge of the flange facing the valve needle is lower than an outer edge of the flange.

5. The fuel injector according to claim 4, wherein a gap is formed between the inner edge of the flange and a projection of the armature.

6. The fuel injector according to claim 5, wherein the gap formed between the inner edge and the projection of the armature is in contact with the throttle gap.

7. The fuel injector according to claim 1, wherein a circular ring-shaped projection of the armature covers the ring-shaped depression.

8. The fuel injector according to claim 7, wherein the circular ring-shaped projection of the armature is arranged in the ring-shaped depression and lies against the damping element.

9. The fuel injector according to claim 8, wherein the circular ring-shaped projection includes a lower end, a diameter of the lower end being smaller than a diameter of the flange.

10. The fuel injector according to claim 9, wherein the damping element is radially clamped between the lower end of the circular ring-shaped projection and the flange.

11. The fuel injector according to claim 8, wherein the circular ring-shaped projection is supported on a cup-shaped cover shell, penetrated by the valve needle.

12. The fuel injector according to claim 11, wherein the flange is disk-shaped and flat and has an outer diameter equivalent to an inner diameter of the cover shell.

13. The fuel injector according to claim 12, wherein the damping element is arranged between the cover shell and the flange.

* * * * *